United States Patent [19]

Onitsuka et al.

[11] Patent Number: 4,789,479
[45] Date of Patent: Dec. 6, 1988

[54] PACKING FOR CHROMATOGRAPHY

[75] Inventors: Hatsuki Onitsuka, Nobeoka; Nobuyoshi Karasawa, Hyuga, both of Japan

[73] Assignee: Asahi Kasei Kogyo Kabushiki Kaisha, Osaka, Japan

[21] Appl. No.: 87,987

[22] Filed: Aug. 17, 1987

Related U.S. Application Data

[60] Continuation of Ser. No. 810,103, Dec. 17, 1985, abandoned, which is a continuation of Ser. No. 663,782, Oct. 23, 1984, abandoned, which is a division of Ser. No. 553,720, Sep. 19, 1983, abandoned.

[30] Foreign Application Priority Data

Sep. 21, 1982 [JP] Japan .................. 57-163143

[51] Int. Cl.$^4$ ............................. B01D 15/08
[52] U.S. Cl. .................. 210/635; 210/656; 210/198.2; 210/502.1; 210/504; 210/505; 210/508
[58] Field of Search .............. 210/635, 656-659, 210/198.2, 502.1, 505, 508, 504, 509

[56] References Cited

U.S. PATENT DOCUMENTS

| | | | |
|---|---|---|---|
| 3,238,056 | 3/1966 | Pall | 210/505 |
| 3,252,270 | 5/1966 | Pall | 210/502.1 |
| 3,455,818 | 7/1969 | Leifield | 210/502.1 |
| 4,112,045 | 9/1978 | Seko et al. | 423/6 |
| 4,118,316 | 10/1973 | Talley | 210/502.1 |
| 4,142,969 | 3/1979 | Funk | 210/502.1 |
| 4,238,334 | 12/1980 | Halbfoster | 210/505 |
| 4,313,832 | 2/1982 | Shimizu | 210/502.1 |
| 4,384,957 | 5/1983 | Crowder | 210/510.1 |
| 4,483,773 | 11/1984 | Yang | 210/198.2 |
| 4,596,660 | 6/1986 | Hou | 210/505 |

OTHER PUBLICATIONS

Kirkland, Introduction to Modern Liquid Chromatography Wiley & Sons, Inc., New York, 1979, pp. 206-210.

Primary Examiner—Ernest G. Therkorn
Attorney, Agent, or Firm—Sprung Horn Kramer & Woods

[57] ABSTRACT

A packing for chromatography, comprising a granular adsorbent and a fibrous material which are substantially homogeneously mixed with each other.

18 Claims, 3 Drawing Sheets

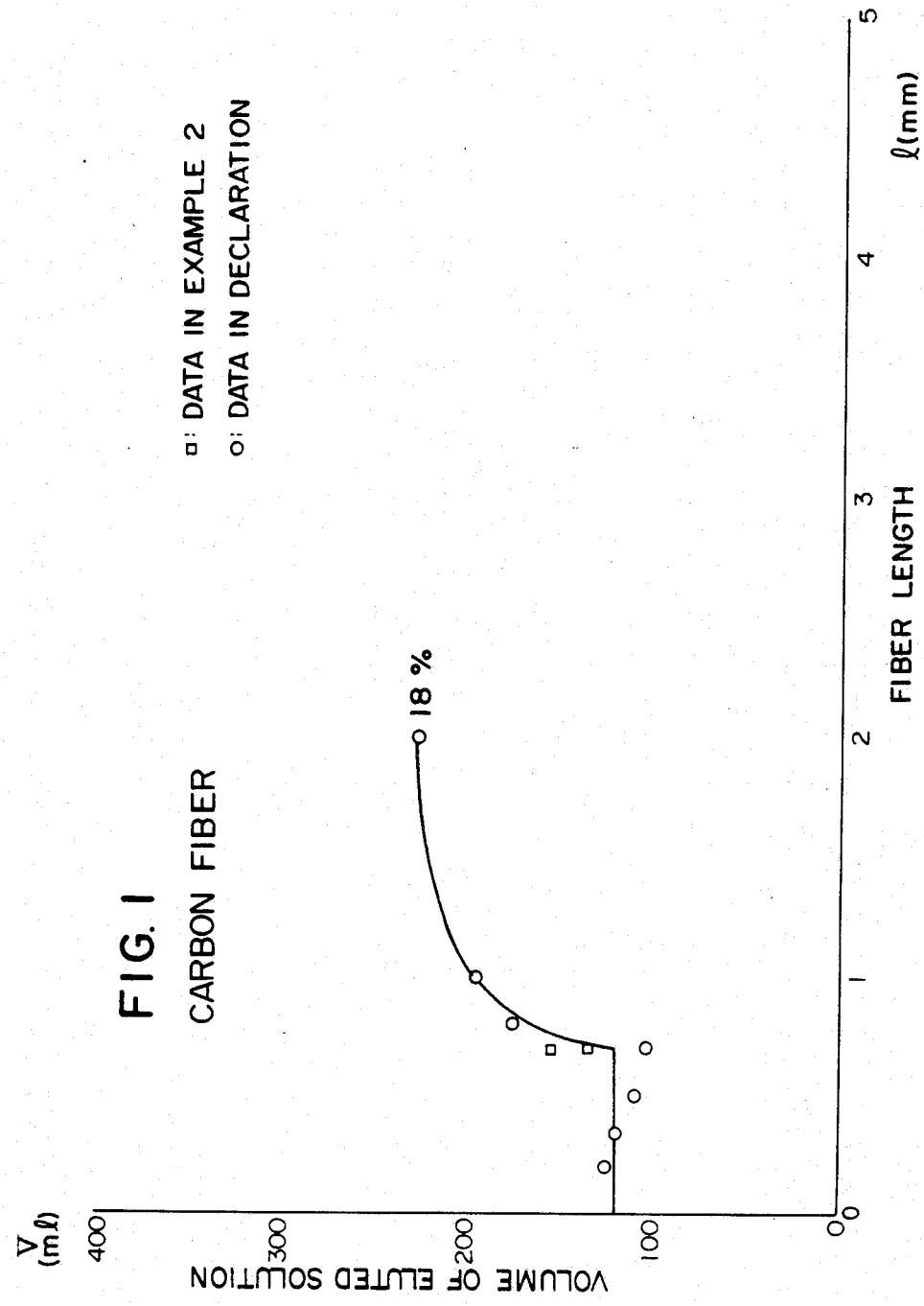

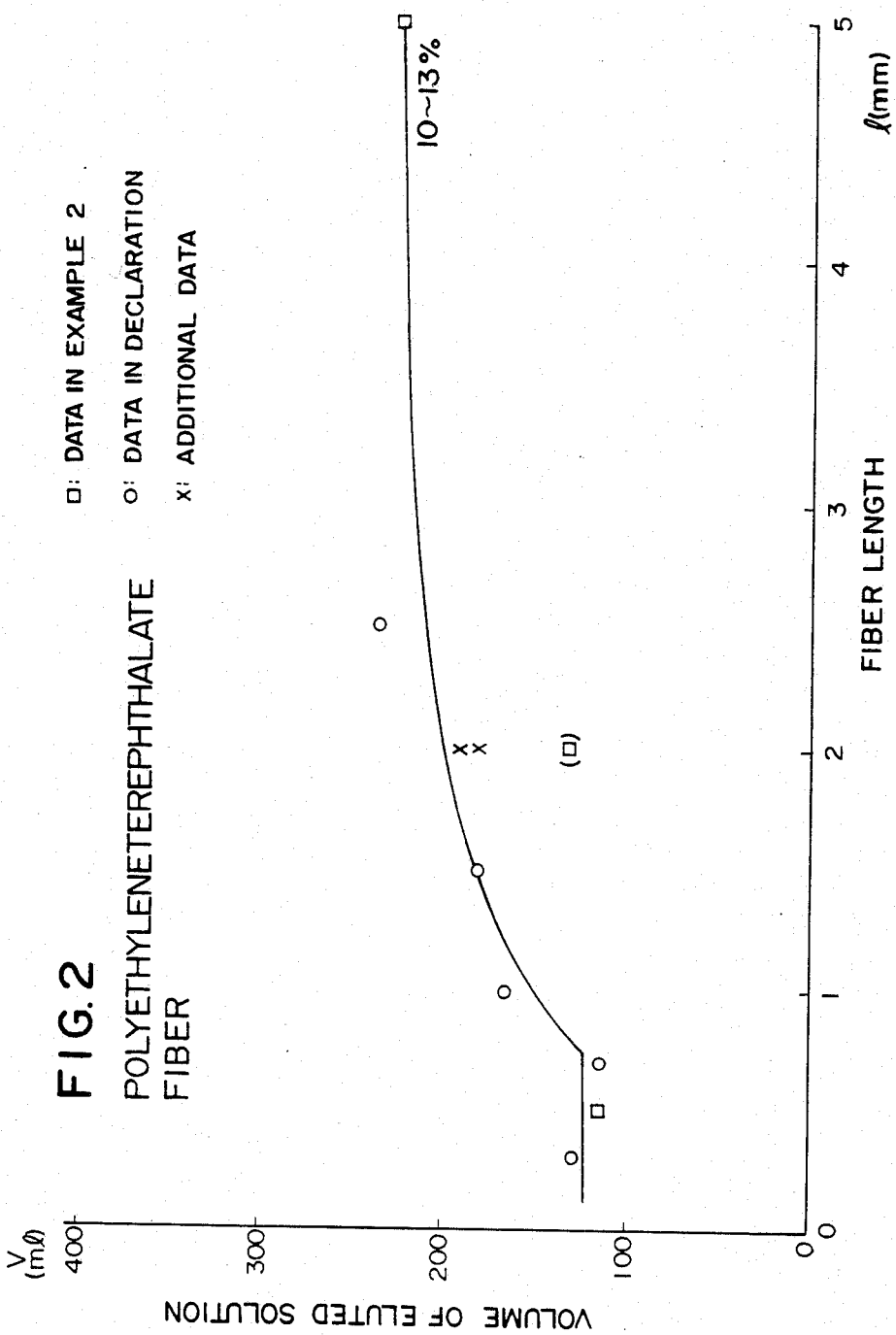

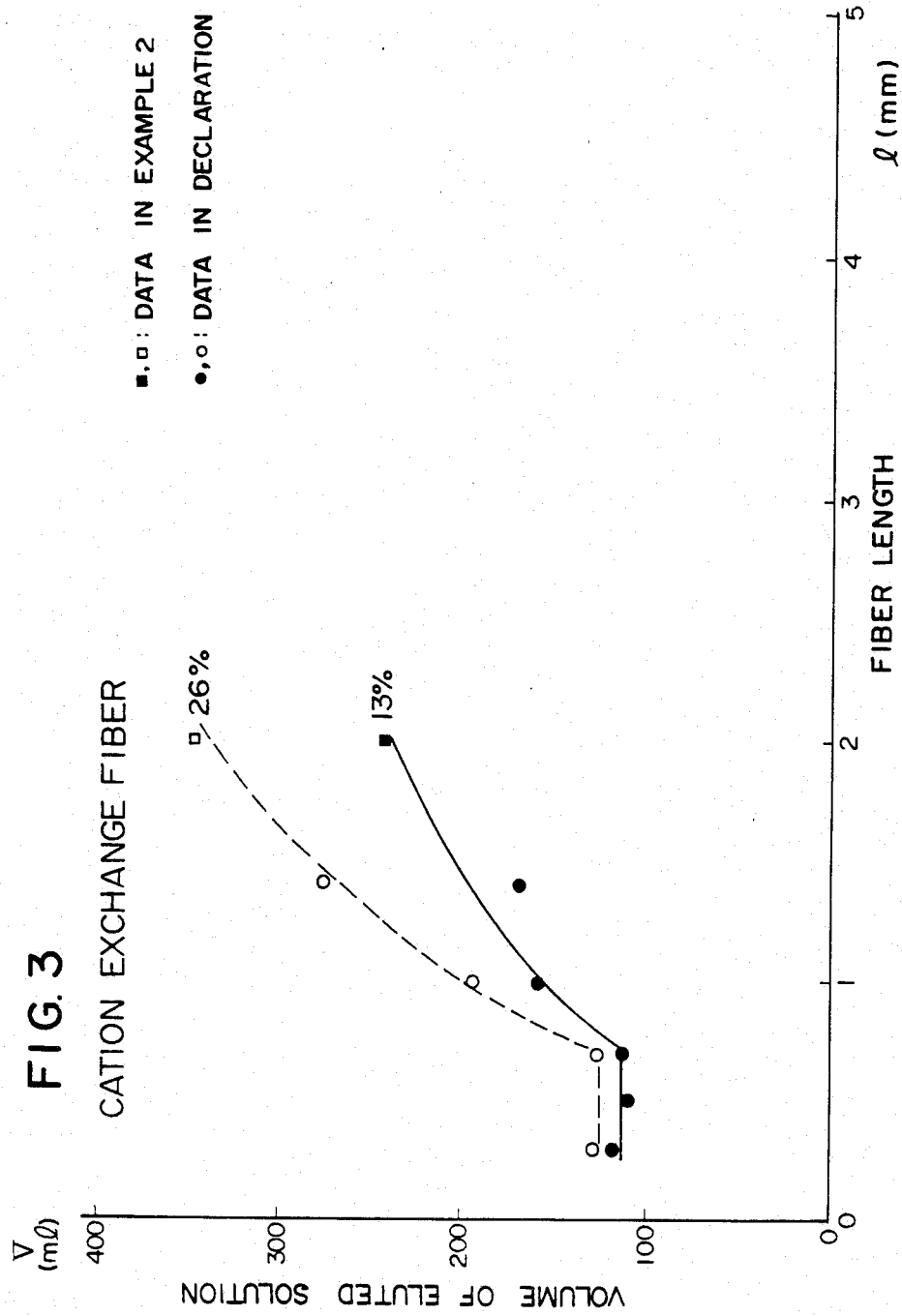

PACKING FOR CHROMATOGRAPHY

This application is a continuation of application Ser. No. 810,103, filed Dec. 17, 1985, which is a continuation of Ser. No. 663,782, filed Oct. 23, 1984, which is a continuation of Ser. No. 533,720, filed Sept. 19, 1983, all now abandoned.

BACKGROUND OF THE INVENTION

1. Field of the Invention

This invention relates to a packing to be used in separation of two or more kinds of materials by chromatography utilizing a packed column.

2. Description of the Prior Art

When two or more kinds of materials are to be separated by chromatography by use of a packed column, the method conventionally used in prior art comprises forming a packed bed of granular packing having adsorption capacity, supplying materials to be separated to the packed bed and eluting the materials adsorbed with an eluant. According to this method, for the purpose of improving the adsorption-desorption rates between the solid phase and the moving phase of the materials to be separated, it is required to use a granular adsorbent with small particle sizes. When an adsorbent with small particle size is employed, however, the pressure loss during passage of an eluant through the packed bed is increased to ensue various problems such that an equipment with high pressure resistance is required to be used; that the flow rate of an eluant must be decreased; and also that the production yield is lowered.

SUMMARY OF THE INVENTION

An object of the present invention is to provide a packing for formation of a packed bed which is small in pressure loss and also small in mixing due to unevenness in flowing.

That is, the present provides a packing for chromatography comprising a granular adsorbent and a fibrous material which are substantially homogeneously mixed with each other.

When a packing bed is formed with the use of the packing of the present invention, through co-presence of a fibrous material in the packed bed, void volume is increased to greatly lower the pressure loss and at the same time can accomplish uniform flow of liquid equal to or better than when filled with only a granular adsorbent.

BRIEF DESCRIPTION OF THE DRAWING

FIGS. 1-3 each compare fiber length and volume of eluted solution for various fibers.

DESCRIPTION OF THE PREFERRED EMBODIMENTS

As the granular adsorbent to be used in the present invention, there may be used known granular materials having adsorption capacity or separation ability formed through voids suitable for separation of the materials to be separated. Examples of available adsorbents may include anion exchange resin, cation exchange resin, various gels such as polystyrene gel, dextran gel, acrylamide gel, silica gel, etc., porous materials such as porous glass, porous quartz beads, porous ceramics, activated charcoal, various zeolites, etc., or these gels or porous materials having a material with adsorption capacities for the materials to be separated carried thereon. As the material to be carried, there may be employed any material which has different adsorption capacities for the materials to be separated and is itself low in solubility in the eluant. Typical examples of such materials are, as solid substance, those used for anion or cation exchange resins. Examples of liquids are nonpolar or weakly polar substances such as saturated hydrocarbons, aromatic hydrocarbons, aromatic carboxylic acid esters, silicones, etc. and strongly polar substances such as phosphoric acid esters, formamides, glycols, polyglycols, glycerine, etc.

The porosity of a porous material or a gel is generally ranging from 20 vol. % to 90 vol. %.

The pore size of a porous material is generally 3 Å to 5,000 Å in terms of the volume average value as measured by a porosimeter according to the mercury pressurization system.

The granular adsorbent may be shaped in forms which are not necessarily required to be completely spherical but also inclusive of indefinite shapes formed during crushing. Its size is within the range conventionally used as the adsorbent may be available. It has generally an area average particle size of 1 μm to 1 mm. There is also no restriction with respect to particle size distribution, but it is preferred to be as narrow as possible.

As the fibrous material to be used in the present invention, there may be employed any known fibrous material which is cut into strips. The species of the fibrous material to be used is inclusive of vegetable fibers such as cotton, hemp and others; animal fibers such as wool, silk and others; regenerated fibers such as a rayon fiber and an acetate fiber; synthetic fibers such as a polyamide fiber, a polyester fiber, a polyurethane fiber, a polyolefin fiber, a polyvinyl chloride fiber, a polyvinylidene chloride fiber, a polyfluoroethylene fiber, a polyacrylonitrile fiber and a polyvinyl alcohol fiber; various inorganic fibers such as a carbon fiber and the fibers produced from nickel metal, titanium metal, stainless steel, glass or ceramics. It is also possible to use these fibers having introduced ion-exchange groups. In case of a fibrous material having no ion-exchange group, uniformness of the packed bed after packed is particularly good. Particularly preferred are inorganic fibers or synthetic fibers.

The fibrous material may have a length which is desired to be longer for effective reduction of pressure loss, but in order to maintain more uniformly the flow through the packed bed and also reduce efficiently the pressure loss, its length should preferably within a range from 0.1 mm to 5 mm, more preferably from 0.5 mm to 2 mm.

The thickness of the fibrous material to be used may preferably be smaller in its diameter than the average particle size of the adsorbent employed, more preferably having a fiber diameter of ¼-fold of the average particle size.

The term "fiber diameter" used herein is defined by the following equation:

$$d = 2\sqrt{\frac{x}{\pi \cdot p \cdot l}}$$

where d is the diameter of the fiber in centimeters, x is the weight of the fiber in grams, l is the length of the fiber in centimeters, and η is the density of the fiber in gram/cubic centimeter. The fibers used are generally of a circular cross-section, but the above-mentioned definition for the fiber diameter should also be applied to fibers of a non-circular cross-section.

Fibrous materials with a relation of $l/d \geqq 5$ are generally employed.

A fibrous material can exhibit its effect in alleviating the pressure loss through the packed bed even when admixed in a small amount to form a packed bed, but its weight under dried state may preferably 0.5% to 60% based on the sum with the granular adsorbent under dried state, more preferably 1% to 40%.

A fibrous material and a granular adsorbent may be used in any desired combination, but it is preferred to choose these materials so that the difference in true specific gravity may be within 3.

The fibrous material and the granular adsorbent are required to form a packed bed under the state mixed substantially homogeneously with each other.

The packing according to the present invention can be packed in a column according to either dry system or wet system. When a wet system is employed, the fibrous material and the liquid medium to be employed for packing are desired to be high in affinity for each other. For example, when the medium is water or an aqueous solution, there may be employed a highly hydrophilic rayon fiber, carbon fiber coating with a sizing agent or cellulose as such, but it is desired to apply a surface treatment with a silane compound, etc. on such a fiber as polyamide fiber, polyester fiber or polyacrylonitrile fiber or alternatively add a surfactant, etc. to the medium for the purpose of improving mutual affinity therebetween.

When the packing is to be packed in a slurry with the use of a liquid medium, it is preferred to adjust the concentration of a fibrous material in the slurry so as to prevent mutual entanglements between the fibrous materials or entanglements between the fibrous material and the granular adsorbent, generally at 2 wt. % or lower, more preferably at 0.5 wt. % to 0.02 wt. %.

When packing is to be performed according to dry system, the fibrous material and the granular adsorbent are thoroughly dried, the entanglement between fibrous materials or the agglomeration between adsorbents is well loosened before homogeneous mixing of both by means of mechanical force such as stirring, followed by uniform feeding of the mixture to the whole column, which may preferably be practiced by carrying out the packing operation while moving the inlet for packing.

The present invention can exhibit its specific feature particularly in separation of materials, which is small in separation coefficient, requires a very large number of stages for separation and therefore requires a long column length, for example in separation of rare earth elements or in separation of isotopes.

The chromatography mentioned herein refers to a method in which the materials to be separated are separated into respective components while the materials are developed through a separation column by utilizing the difference in adsorption force between the materials to be separated relating to the adsorbent (including not only the difference in ion-exchange or physical adsorption, but also the difference in diffusion velocity due to the difference in pore sizes of the fixed phase). When a fluid utilized for development is stronger in adsorption force than the materials to be separated or when the adsorption forces of the materials to be separated are changed through the chemical reaction with the material in the fluid for development, it is called as the displacement chromatography. Otherwise, in most cases, it is called as the elution chromatography in which the adsorption band of the materials to be separated are elongated with the progress of development.

The present invention is further illustrated by the following Examples, by which the present invention is not limited.

EXAMPLE 1

A separation column of an inner diameter of 100 mm $\phi$ and a length of 2.7 m was prepared. A styrene-divinyl benzene copolymer was chloromethylated and treated with trimethylamine to be formed into an anion exchange resin with quaternary ammonium group (true specific gravity: 1.24, crosslinking degree: 5), followed by classification into sizes of 100 to 200 mesh with an average particle size of 103 $\mu$m and conversion to the $Cl^-$ form. A mixture of this resin with a carbon fiber (true specific gravity: 1.75) cut into a diameter of 7 $\mu$m and a length of 0.5 mm mixed at a proportion as indicated in Table 1 was packed in the above column to the top, by feeding a slurry of 7 wt. % of the above packing mixture in 1N HCl solution at a rate of 780 ml/min.

After packing, 1N HCl solution was permitted to flow at a flow rate of 780 ml/min., and the pressure loss was measured by the pressure gauges equipped at the outlet and the inlet of the column, with the pressure loss through the device in absence of the packed bed being also measured as blank, and the pressure loss through the packed bed was determined from the difference between the both of the pressure losses. The results are shown in Table 1.

After measurement of pressure loss, 50 liters of pure water were passed through the column to replace the HCl solution in the packed bed with water, and $Cl^-$ ions adsorbed were eluted with 50 liters of $1N\ KNO_3$. Then, the amount of $Cl^-$ ions in the eluted solution was quantified by titration with AgCl to determine the adsorption capacity per unit volume of the column. The results are shown in Table 1, at the third column.

TABLE 1

| Content of fibrous material mixed (wt. %) | Pressure loss (Kg/cm$^2$) | Adsorption capacity (meq/cc) |
|---|---|---|
| 0 | 7.2 | 1.21 |
| 3.0 | 4.6 | 1.10 |
| 10.0 | 2.0 | 0.85 |
| 16.0 | 1.1 | 0.60 |
| 20.0 | 0.6 | 0.51 |
| 36.0 | 0.23 | 0.25 |
| 42.0 | 0.20 | 0.21 |
| 51.0 | 0.17 | 0.18 |

EXAMPLE 2

Into the same column as used in Example 1 was packed to the top a packing, which was a mixture of an anion exchange resin of a vinyl pyridine-divinylbenzene copolymer with an average particle size of 65 $\mu$m (true specific gravity: 1.25, crosslinking degree: 18) and a fibrous material as shown in Table 2. Packing was conducted by feeding a slurry of the above packing mixed in an amount of 1 wt. % into a 0.1N HCl solution at a rate of 560 ml/min.

Into the slurry of the packing employing a fibrous material of polyester, there was also added 0.6 g of a polyethylene glycol type surfactant per liter of slurry for enhancement of affinity for the liquid medium.

In order to confirm uniformness of the liquid flow through the packed bed a 4N HCl aqueous solution containing 0.1M/liter iron (III) chloride was fed at a rate of 560 ml/min. from the top of the column until the iron (III) ion concentration in the effluent reaches equilibrium to have iron (III) ions adsorbed onto the anion exchange resin. Then, a 4N HCl aqueous solution containing 0.4M/liter of titanium (III) chloride was fed at a rate of 560 ml/min. from the top of the column, and the solutions eluted from the bottom were collected in fractions each of 80 ml, and the iron (III) iion concentrations in the solutions were determined by titration to prepare an elution curve of iron (III) ion.

The concentration at the portion where the iron (III) ion concentration is constant is defined as G, and the eluted liquid volume (V) from the rear end of the iron (III) adsorption band of the fractions with concentration values between 0.9 G and 0.1 G was determined as the value indicating sharpness of the elution curve (see FIG. 1).

Also, after iron (III) ions reached adsorption equilibrium during feeding of the iron (III) ion solution, the pressure loss through the packed bed was determined similarly as in Example 1 by further feeding the iron (III) ion solution into the column. The results are shown in Table 2.

0.03M/liter of uranyl chloride was fed, followed subsequently by feeding of a 4N HCl aqueous solution containing 0.4M/liter of titanium chloride (III) at a rate of 0.63 liter/min. thereby to develop and move the uranium adsorption band.

The eluted solutions from the bottom of the separation column as the progress of development were collected in divided fractions each of 100 ml, and the uranium concentration in each fraction was quantitatively determined by a fluorescent X-ray device to determine the elution curve. The isotope ratio of $235_U$ to $238_U$ in the uranium solution in the vicinity of the interface between the Ti (III) and the uranium adsorption band was measured by a mass spectrometer.

The ratio of $235_U$ to $238_U$ measured was 0.007515 (the isotope ratio in the starting uranium was 0.007252). The pressure loss through the packed bed during development was 0.29 Kg/cm$^2$.

COMPARATIVE EXAMPLE 1

Into the same column as used in Example 3, only the same anion resin was packed, and the experiment for separation of uranium isotopes was conducted according to the same procedure.

The ratio of $235_U$ to $238_U$ measured was 0.007504, and the pressure loss through the packed bed during devel-

TABLE 2

| Kind | Fibrous material | | | | Pressure loss (Kg/cm$^2$) | Volume of eluted solution V (ml) |
| --- | --- | --- | --- | --- | --- | --- |
| | True specific gravity | Diameter (μm) | Length (mm) | Mixed proportion (wt. %) | | |
| Carbon fiber | 1.75 | 14 | 0.7 | 7.2 | 5.6 | 134 |
| | | 14 | 0.7 | 18.8 | 0.71 | 103 |
| | | 14 | 0.7 | 28.2 | 0.37 | 153 |
| Polyethylene terephthalate fiber | 1.38 | 15 | 0.5 | 13.0 | 1.35 | 115 |
| | | 15 | 2 | 13.0 | 0.94 | 131 |
| | | 15 | 5 | 13.0 | 0.72 | 218 |
| Polyamide fiber (6,6-nylon) | 1.14 | 14 | 2 | 5.0 | 3.6 | 197 |
| | | 32 | 2 | 5.0 | 3.4 | 260 |
| Cation exchange fiber having introduced sulfonic acid groups into cellulose fiber | 1.12 | 29 | 2 | 26.0 | 0.26 | 345 |
| | | 14 | 2 | 13.0 | 0.77 | 240 |
| Anion exchange fiber having introduced trimethylammonium groups into polystyrene | 1.16 | 14 | 2 | 13.0 | 0.85 | 295 |
| None | — | — | — | 0 | 13.8 | 126 |

EXAMPLE 3

A cylindrical separation column of a inner diameter of 100 mm and a length of 2.7 m equipped with a jacket and a filter was prepared, and a packing comprising a mixture of an anion exchange resin of a vinyl pyridine-divinyl benzene copolymer with an average particle size of 86 μm (true specific gravity: 1.25, crosslinking degree: 8) and a carbon fiber of a diameter of 7 μm and a length of 1.0 mm (true specific gravity: 1.75) (mixing proportion: 23 wt. %) was packed into the above separation column.

The packing in the slurry was 3 wt. % and the slurry was fed at a rate of 630 ml/min. After packing, a 4N HCl aqueous solution containing 0.1M/liter iron (III) chloride was fed through the column to have adsorbed iron (III) ions adsorbed onto the anion exchange resin until equilibration. Then, 1.8 liters of a 4N HCl aqueous solution containing 0.2M/liter uranous chloride and opment was 2.9 Kg/cm$^2$.

EXAMPLE 4

A cylindrical separation column of a inner diameter of 200 mm and a length of 4.0 m equipped with a jacket and a filter was prepared, and a packing comprising a mixture of a cation exchange resin of a sulfonated styrene-divinyl benzene copolymer with an average particle size of 98 μm (true specific gravity: 1.34, crosslinking degree: 20) and a carbon fiber of a diameter of 7 μm and a length of 0.5 mm (true specific gravity: 1.75) (mixing proportion: 35 wt. %) was packed into the above separation column in a slurry of 3 wt. % and at a feeding rate of the slurry of 4 liters/min.

While maintaining the packed column at 95° C., the three kinds of solutions of (i) an aqueous 0.5M/liter H$_2$SO$_4$ solution, (ii) a mixed solution of 15 mM/liter of rare earth metal elements purified from monazite and 15 mM/liter of Ethylenediaminetetraacetic acid (EDTA) at pH=3 and (iii) an aqueous 15 mM/liter solution of EDTA at pH=7 were permitted to flow therethrough repeatedly to effect separation of the rare earth metal elements. Each solution was fed to the column at the rate of 4 liter/min. and the changes in pressure loss after feeding of the (i) aqueous sulfuric acid solution accompanied with repeated separation cycles were determined.

As the result, the pressure loss through the packed bed at the first (initial) separation operation was 0.5 Kg/cm$^2$, which was increased to 0.6 Kg/cm$^2$ at the fifth operation and to 0.9 Kg/cm$^2$ at the 50'th operation.

COMPARATIVE EXAMPLE 2

The same device as in Example 4 was packed with only the same cation exchange resin as used in Example 4, and the same operations were repeated and pressure losses were measured.

The pressure loss in the first operation was 4.9 Kg/cm$^2$, which was increased to as high as 20 Kg/cm$^2$ on the fifth operation.

EXAMPLE 5

A glass column of an inner diameter of 20 mm $\phi$ and a length of 1 m was prepared and packed with a packing having the compositions as shown in Table 3, and pressure losses therethrough were determined with an eluant according to the same procedure as in Example 1. The results are shown in Table 3.

TABLE 3

| Adsorbent | Fibrous material | Packing method | Eluant | Content of fibrous material | Pressure loss |
|---|---|---|---|---|---|
| Polystyrene gel<br>PS = 20μ<br>PD = 520 Å<br>CD = 20<br>ρ = 1.06<br>PV = 55 vol. % | Glass fiber<br>d = 5μ<br>l = 2 mm<br>ρ = 2.54 | 0.5 wt. %<br>CCl$_4$ slurry | CCl$_4$<br>1.6 ml/min. | 0<br>32 wt. % | 4.5 Kg/cm$^2$<br>0.38 Kg/cm$^2$ |
| Zeolite<br>PS = 115μ<br>PD = 5 Å<br>ρ = 1.99<br>PV = 38 vol. % | Stainless steel fiber<br>d = 10μ<br>l = 1.5 mm<br>ρ = 7.9 | Dry system<br>Natural falling | Hexane<br>88 ml/min. | 0<br>55 wt. % | 1.3 Kg/cm$^2$<br>0.56 Kg/cm$^2$ |
| Cation exchange resin of sulfonated styrene-divinylbenzene copolymer<br>PS = 82μ<br>ρ = 1.33<br>CD = 10 | Teflon fiber<br>d = 20<br>l = 1 mm<br>ρ = 2.1 | 0.1 N H$_2$SO$_4$<br>3 wt. % slurry<br>6.3 ml/min. | 0.1 N H$_2$SO$_4$<br>63 ml/min. | 0<br>20 wt. % | 5.8 Kg/cm$^2$<br>1.3 Kg/cm$^2$ |

PS = particle size; PD = pore diameter; CD = crosslinking degree; ρ = true specific gravity; d = fiber diameter; l = fiber length; PV = pore volume

What is claimed is:

1. In a chromatographic separation of materials in a liquid specimen wherein the specimen is passed through a column containing an adsorbent packing, thereby differentially to adsorb materials in the specimen, and thereafter eluting the adsorbed material, the improvement which comprises employing as the packing a substantially homogeneous mixture of a granular adsorbent and a fiber, the fiber being present in about 0.5 to 60% by weight of dry fiber plus granular adsorbent, the fiber having a length up to about 0.7 mm and a ratio of length to diameter of at least about 5.

2. A process according to claim 1, wherein the fiber is about 0.1 to about 0.7 mm in length.

3. A process according to claim 1, wherein the fiber is about 0.5 to about 0.7 mm in length.

4. A process according to claim 1, wherein the fiber is about 0.1 mm in length.

5. A process according to claim 1, wherein the fiber is about 0.5 mm in length.

6. A process according to claim 1, wherein the fiber is about 0.7 mm in length.

7. A process according to claim 1, wherein the fiber has no ion-exchange group.

8. A process according to claim 1, wherein the fiber has a diameter which is ¼ fold or less of the average size of the granular adsorbent.

9. A process according to claim 1, wherein the fiber is contained in an amount of 1 to 40% by weight.

10. A process according to claim 1, wherein the difference in true specific gravity between the fiber and the granular adsorbent is within 3.

11. A process according to claim 1, wherein the packing is packed in a slurry with the use of liquid medium.

12. A process according to claim 11, wherein the liquid medium has high affinity for the fiber.

13. A process according to claim 11, wherein the concentration of fiber in the slurry is 2 wt. % or lower.

14. A process according to claim 11, wherein the liquid medium is water or an aqueous solution.

15. A process according to claim 14, wherein a surfactant is added to the slurry.

16. A process according to claim 14, wherein the fiber is a carbon fiber coated with a sizing agent.

17. A process according to claim 14, wherein the fiber is polyamide fiber, polyester fiber or polyacrylonitrile fiber treated with a silane compound.

18. A process according to claim 1, wherein the packing is packed in the column dry.

* * * * *